United States Patent [19]

Griffith

[11] 4,233,779
[45] Nov. 18, 1980

[54] AUTOMATIC ENVIRONMENT STABILIZER AND PROTECTION DEVICE FOR PLANTS

[76] Inventor: Jerry Griffith, 1038 Westgate Dr., Charleston, Ill. 61920

[21] Appl. No.: 11,790

[22] Filed: Feb. 14, 1979

[51] Int. Cl.$^3$ .................. A01G 13/04; A01G 9/24
[52] U.S. Cl. ................................. 47/26; 47/2; 47/28 R; 47/31; 236/49; 236/101 D
[58] Field of Search ............... 47/28 R, 26, 2, 19, 47/29, 30, 31; 236/101 D, 91 A, 49

[56] References Cited

U.S. PATENT DOCUMENTS

| | | | |
|---|---|---|---|
| 196,165 | 10/1877 | Pardessus | 47/29 |
| 436,183 | 9/1890 | Moore et al. | 47/31 |
| 585,009 | 6/1897 | Taylor et al. | 47/28 X |
| 1,074,828 | 10/1913 | Bigelow | 47/31 |
| 1,241,641 | 10/1917 | MacKay | 236/49 |
| 1,720,522 | 7/1929 | Ludwick | 236/49 X |
| 1,955,560 | 4/1934 | Payne | 236/49 X |
| 2,434,090 | 1/1948 | Alton | 236/49 |
| 2,519,239 | 8/1950 | Eddison et al. | 236/49 |
| 2,608,797 | 9/1952 | Rawson | 47/19 |
| 3,174,687 | 3/1965 | Gilbert | 236/91 A |
| 3,366,333 | 1/1968 | Diehl | 236/101 D |
| 3,436,016 | 4/1969 | Edwards | 236/49 |
| 3,946,521 | 3/1976 | Ours | 47/28 R |

FOREIGN PATENT DOCUMENTS

| | | | |
|---|---|---|---|
| 1296601 | 5/1962 | France | 47/19 |
| 882951 | 11/1961 | United Kingdom | 47/30 |

*Primary Examiner*—Steven A. Bratlie
*Attorney, Agent, or Firm*—Ray E. Snyder

[57] ABSTRACT

An attachment for a plant protection device is described that automatically maintains a life sustaining environment over a broad range of ambient temperature conditions. The invention consists of a cylindrical collar adapted to be mounted on top of existing open ended plant covers or to be manufactured as an integral part of such a cover and contains a thermostatically controlled butterfly valve for ventilating the plant cover. The thermostat is responsive to ambient temperature outside the plant cover which activates the butterfly valve for controlling the release of warm air from inside the container. The collar and butterfly valve are so designed to provide adequate light and ventilation without wind chill to the protected plants and also includes protection against flying insects and random or unwanted pollination.

5 Claims, 4 Drawing Figures

U.S. Patent  Nov. 18, 1980  4,233,779
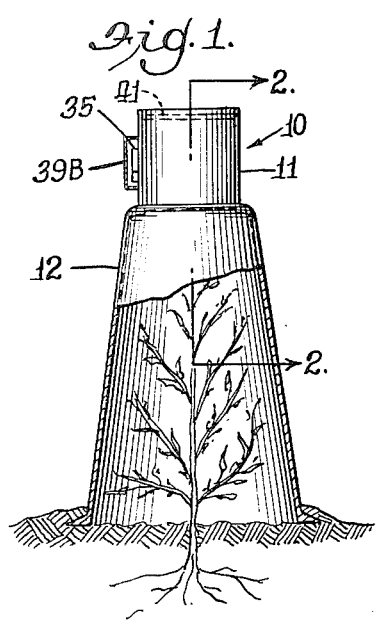
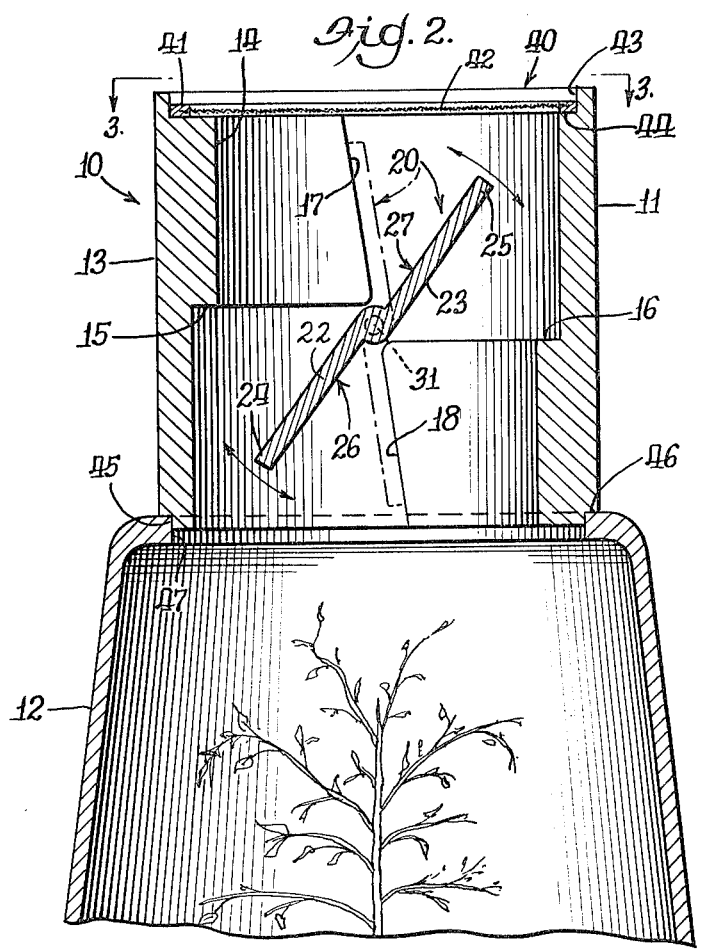
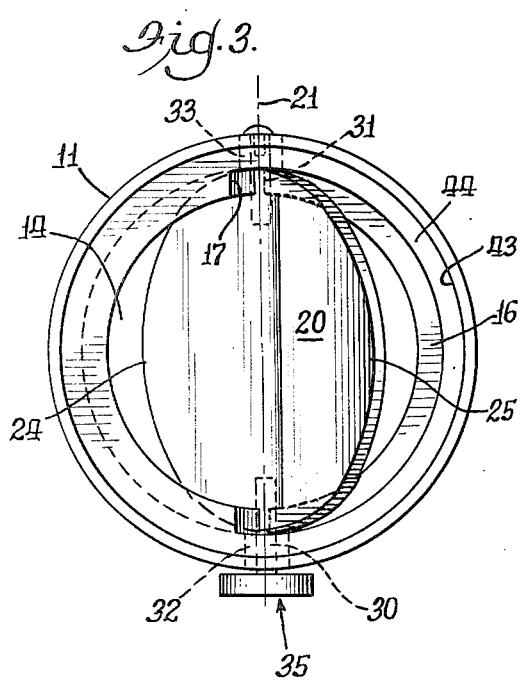
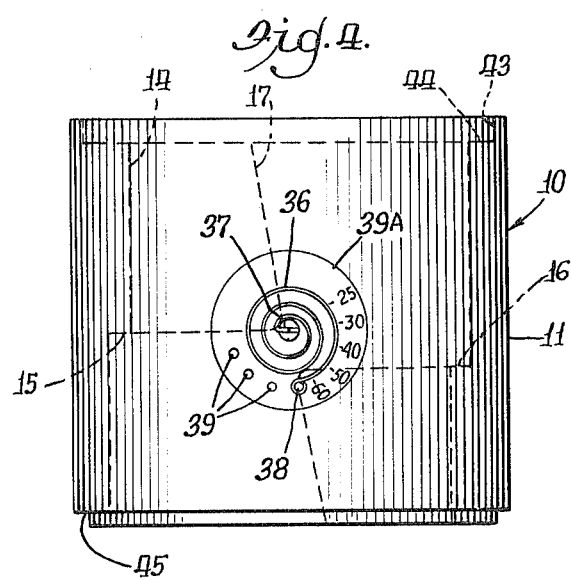

AUTOMATIC ENVIRONMENT STABILIZER AND PROTECTION DEVICE FOR PLANTS

BACKGROUND OF THE INVENTION

1. Field of the Invention

This invention relates generally to the field of plant husbandry and more specifically to thermostatically controlled protective covers for plants.

2. Description of the Prior Art

Protective plant covers such as commercially available cones constructed of styrofoam material are well-known in the art. Thermostatically controlled plant protectors are also known in the patent art as exemplified by the patent to Taylor et at, U.S. Pat. No. 585,009 and the patent to Ours, U.S. Pat. No. 3,946,521.

Other types of thermostatically controlled devices are also well-known, such as the automatic choke in an automobile carburetor. The patent art also has a variety of such devices as exemplified by the Damper Regulator to Ludwick, U.S. Pat. No. 1,720,522 and the Thermostatic Control for Electron Discharge Devices to Payne, U.S. Pat. No. 1,955,560.

Thermostatic controls for brooders and other enclosed spaces are also known in the patent art as shown in the patent to McKay, U.S. Pat. No. 1,241,641 and the patent to Alton, U.S. Pat. No. 2,434,090 and the Thermostatic Control for a greenhouse to Eddison et al., U.S. Pat. No. 2,519,239.

The devices described above accomplish some of the individual advantages of the present invention, but none singly or in combination accomplish all of the plant protective features intended by the present invention. Most existing plant covers and protection devices either cover a plant to retain heat, without providing adequate ventilation and light, or they incorporate "windows" or vents which provide ventilation and light but allow radiant heat to escape during cold weather because of the lack of insulating properties, especially at night time. In addition, most existing plant covers have no design features to prevent wind chill effects, or to prevent insect pest damage and unwanted pollination. In this regard, it should be noted that cool temperatures in combination with wind velocity can be as damaging to young plants as cold temperatures alone.

SUMMARY OF THE INVENTION

The present invention is directed to an attachment in the form of a cylindrical collar adapted to be mounted on top of an existing or commercially available plant cover that is modified to receive the collar. The collar is constructed of rigid styrofoam or other rigid insulating material and contains an axially pivoted butterfly valve that is opened in response to movement imparted by a bimetallic coil strip or other thermostat. The thermostat is mounted on the exterior of the collar so as to be responsive to ambient outside temperature. The upper end of the collar is adapted to be covered by a screen or cloth filter to prevent the entry of insects or pollen and the overall length of the collar is sufficient to allow arcuate movement of the butterfly valve therein without contacting the upper screen.

BRIEF DESCRIPTION OF THE DRAWINGS

FIG. 1 is a vertical view, partially in section, of a conical protective plant cover and the collar attachment of the present invention;

FIG. 2 is an enlarged cross-sectional view of the collar and assembly only taken on line 2—2 of FIG. 1;

FIG. 3 is a perspective top view taken on line 3—3 of FIG. 2; and

FIG. 4 is an external side view of the collar showing details of the bimetallic coil strip.

DETAILED DESCRIPTION OF THE PREFERRED EMBODIMENT

The improved plant protective device or collar of the present invention is illustrated in the above figures and is designated generally by the numeral 10. The device 10 is in the form of a cylindrical sleeve body 11 and which may be adapted to be mounted on top of a conical plant cover 12. The sleeve 11 has an external cylindrical surface 13 and is formed with an internal, generally cylindrical, cavity 14. The interior wall of the cavity 14 is formed with horizontal semi-circular shoulders at 15 and 16, and nearly vertical shoulders or stops at 17 and 18. The sleeve body 11 is preferably constructed of molded rigid styrofoam or other rigid light-weight insulting material.

A generally flat circular butterfly valve 20 is mounted within the cavity 14 and is adapted to turn in an arc about a horizontal axis 21. The valve 20 may be slightly enlarged surrounding the axis 21 and has two laterally extending wings 22 and 23 which may be offset axially with respect to the axis 21 by an amount equal to the thickness of the wings 22 or 23. In a closed position, the semi-circular tips 24 and 25 of the wings 22 and 23, respectively, are adapted to abut and seal against the bottom of shoulder 15 and the top of shoulder 16. In a fully open position, the edges 27 and 26 of the valve 20 abut against the shoulders 17 and 18, respectively. The butterfly valve 20 preferably is constructed of the same material as the sleeve body 11, or other lightweight insulating material.

The valve 20 is supported within the cavity 14 by two axles 30 and 31. The axles 30 and 31 are rigidly attached to the valve 20 on diametrically opposite sides thereof colinear with the axis 21, and are rotatably mounted within journal supports 32 and 33 located at opposite sides of the sleeve body 11. The axle 30 extends past the outer wall 13 of the cylindrical body 11 and is attached to a thermostat 35. The thermostat 35 may be a bimetallic strip 36 in the form of a spiral coil. One end of the strip 36 is attached to the axle 30 by means of a slot 37, or other suitable means. The other end of the strip 36 is attached to a pin 38 or other suitable means mounted on the outer surface 13 of the sleeve body 11. A number of position points 39 for the pin 38 may be provided on the body 11 for calibrating the thermostat 35 so as to open the valve 20 at some desired temperature. The pin position 39 is initially selected so that the butterfly valve 20 is completely closed at some pre-selected lower limit temperature and remains closed for any ambient outside temperature below that value. A graduated decal 39A may be positioned on the outer wall 13 coaxial with the axle 30 for aiding in the initial location of the pin 38, and a protective ventillated cover 39B may be mounted over the thermostat 35. The bimetallic strip 36 is designed with the appropriate length and temperature response characteristics so as to produce the desired amount of angular opening of the butterfly valve 20 over the anticipated temperature range.

A protective circular cover screen 40 is adapted to be mounted on top of the body portion 11 and comprises a rigid circular rim 41 surrounding a fine mesh screen 42.

The cylindrical sleeve 11 is formed at its upper end with a recessed circular notched opening 43 which defines a horizontal circular ledge 44 around the perimeter of the cavity 14. When the cover 40 is located in place within the recess 43, the rim 41 abuts against the shoulder 44 and the screen 42 completely covers the upper end of the cavity 14. The axial length of the body 11 is sufficient to allow arcuate movement of the butterfly valve 20 without touching the screen 42.

The bottom edge of the sleeve 11 is formed on its outer periphery with circular notched groove 45 which defines a horizontal circular ledge 46. The grooved portion 45 is adapted to be received within a circular opening 47 formed in the top of a plant cover 12 with the shoulder 46 abutting against the top of the opening 47. The groove 45 should form a frictional or glued or taped, etc. fit with the opening 47 so as to prevent the collar 10 from being disclodged or blown off the top of the cone 12. Additionally, the dimensions of the notched groove 45 and of the recessed groove 43 should be closely matched so as to permit nesting and stacking of the collars for shipment and storage.

In operation, the collar 10 may be mounted on top of a protective plant cover 12 and the pin 39 is located so as to calibrate the thermostat 35 for a predetermined opening temperature. At this predetermined temperature, or for any temperature below, the edges 24 and 25 of the butterfly valve 20 form a light tight seal against the shoulders 15 and 16. When the outside ambient temperature increases above the predetermined minimum, the thermostat 35 responds to the temperature and exerts a torque on the axle 30 attached to the butterfly valve 20. The valve 20 opens progressively with increasing temperature and describes an arcuate motion as indicated in FIG. 2 of the drawings. The valve 20 can continue to open in response to rising temperature until such time as the edges 26 and 27 abut against the shoulders 18 and 17 respectively. Further arcuate motion of the valve 20 would tend to close the cavity 14 which is not desired. When fully opened, the valve 20 permits the passage of light through the collar 10 where it can fall directly on the plants contained within the cover 12. For this purpose, the interior of the cavity 14 may be coated with a reflective surface to enhance light transmission to the plants. Also, with the valve 20 open, the collar 10 also serves as a chimney for exhausting air at elevated temperatures from within the cover 12.

The valve 20 in a fully opened position against the stops 17 and 18 also serves to enhance ventilation within the cover 12 when wind or moving air is present outside of the collar 10. With the valve 20 fully opened, or even partially opened, it effectively divides the cavity 14 into two vertical passages. These passages will be of uneven cross-sectional area except for one precise temperature. The moving air across the top of the collar 10 produces a differential pressure in these two passages. This differential causes air to be exhausted upwardly through one passage and moved downwardly into the interior of the plant cover 12 through the other passage. When outside ambient temperatures and wind velocity are such that exposed plants might suffer wind chill, this gentle circulation of air caused by the collar design protects the plants from the effects of such chill without restricting the supply of essential fresh air.

The cover screen 40 placed on top of the collar 10 is an important feature of the invention. The mesh on the screen 42 is fine enough to block out unwanted pollen and dust as well as other debris such as insects, hail and falling twigs, but still permits the passage of light and essential air. The elevation of the screen 40 above the valve 20 is sufficient to allow free arcuate movement of the valve 20 into a fully opened position without touching the mesh screen 42.

There has been provided by this invention an efficient, light-weight, plant protective device adapted to be used in conjunction with or as an integral part of an existing plant cover. The device provides an effective light tight and heat-trapping seal below some predetermined minimum temperature and opens to allow the escape of air under elevated ambient temperature conditions. In an open position, the device is effective to direct reflected light and air into the interior of the plant cover for sustaining and enhancing plant growth. The device is also effective to permit ventilation of the plant cover interior under elevated temperatures and in windy conditions without permitting wind chill effects. The device is also effective to protect the plants from entry of insects and debris and unwanted pollination.

It is to be understood that the preferred embodiment shown and described is by way of example only and that many changes and modifications may be made thereto without departing from the spirit of the invention. The invention is not to be considered as limited to the embodiment shown and described except insofar as the claims may be so limited.

I claim:

1. A protective device comprising:
   a portable insulated plant cover having a circular opening in its top, and
   a generally cylindrical housing of thermal insulating material formed with an axial opening therethrough and said housing being adapted to mount in the circular opening in the top of the plant cover;
   a generally flat circular valve of thermal insulating material mounted within said axial opening and disposed to turn about a horizontal diametric axis within said housing;
   semicircular shoulder means formed on the interior of said housing adjacent said valve and adapted to abut against same so as to form a thermal seal with said valve;
   thermal responsive means attached to said valve and responsive to ambient temperature and operable to close said valve against said shoulder means at all temperatures below some pre-determined minimum temperature and to progressively open said valve for temperature in excess of said pre-determined minimum;
   adjustable stop means attached to said thermal responsive means and effective to calibrate said thermal responsive means for operation over some pre-determined ambient temperature range;
   vertical stop means also formed on the interior of said housing and operable to limit the degree of opening of said valve with increasing ambient temperature in excess of said pre-determined minimum temperature; and
   a generally circular screen mounted on said housing at an axial distance remote from said valve and operable to cover said axial opening so as to prevent the entry of insects, pollen and dust into the plant cover.

2. The protective device of claim 1 wherein:
   said circular valve is comprised of two semicircular halves axially displaced from each other by an amount equal to the thickness of each half.

3. The protective device of claim 1 wherein:
said housing is formed at the top of its axial opening with an enlarged circular opening forming a recessed circular ledge for supporting said circular screen.

4. The protective device of claim 3 wherein:
said housing is formed on its bottom extended perimeter with a recessed cylindrical groove adapted to fit within and abut against the circular opening of said plant cover.

5. The protective device of claim 4 wherein:
said recessed cylindrical groove is dimensioned to fit within said enlarged circular opening of another protective device to permit stacking.

* * * * *